H. J. WLY.
GLASS CUTTER.
APPLICATION FILED FEB. 18, 1914.
1,101,604.
Patented June 30, 1914.
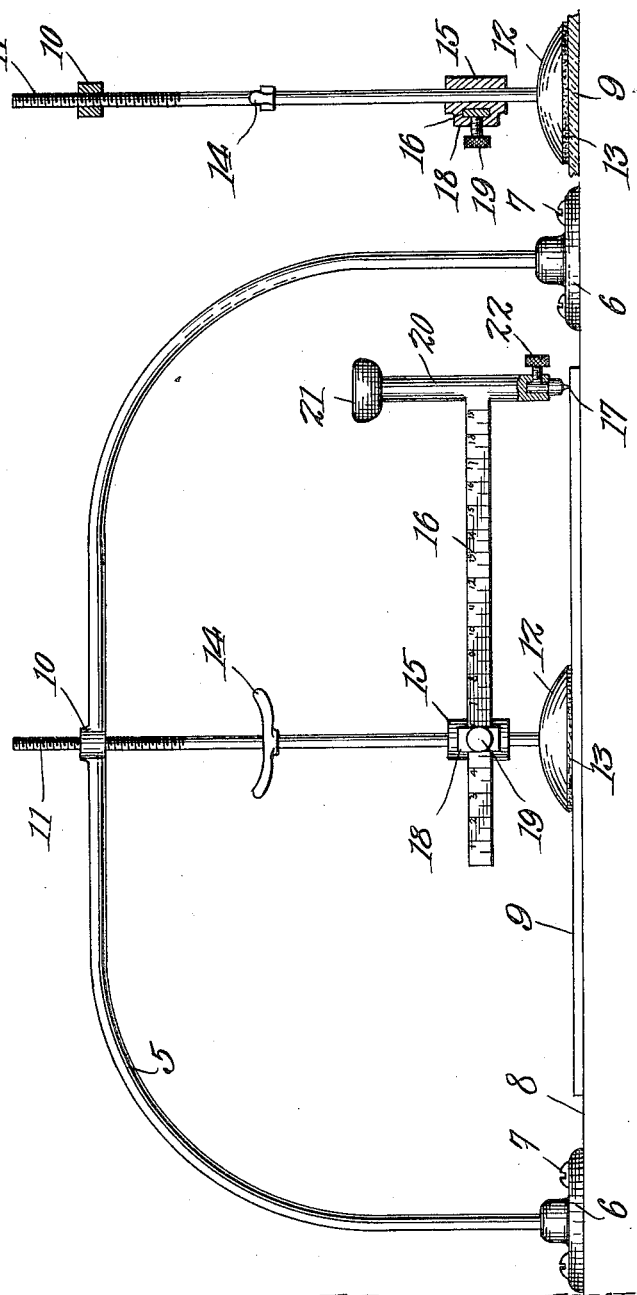

UNITED STATES PATENT OFFICE.

HENRY JOHN WLY, OF MANSFIELD, OHIO.

GLASS-CUTTER.

1,101,604.  Specification of Letters Patent.  Patented June 30, 1914.

Application filed February 18, 1914. Serial No. 819,411.

*To all whom it may concern:*

Be it known that I, HENRY JOHN WLY, a citizen of the United States, residing at Mansfield, in the county of Richland and State of Ohio, have invented certain new and useful Improvements in Glass-Cutters, of which the following is a specification.

The cutter which is the subject matter of the present application for patent is designed primarily for cutting circular pieces or disks from sheets of glass, although it is not limited to use for cutting that material.

It is the object of the present invention to provide a novel and improved cutter of this kind carried by a sweep arm which can be lengthened or shortened according to the diameter of the piece to be cut.

The invention also has for its object to provide a novel and improved support for the cutter which permits adjustment to the thickness of the sheet to be operated on.

Other objects and advantages of the invention will be pointed out in the detailed description appearing hereinafter, and in order that the invention may be better understood, reference is had to the accompanying drawing, in which—

Figure 1 is an elevation of the device, partly broken away, and Fig. 2 is a central vertical section thereof.

Referring specifically to the drawing, the cutting mechanism is carried by an arched supporting frame 5 rising from base members 6, which latter are secured by screws 7 or other suitable means to the top of a bench, table or other flat surface 8, on which the sheet 9 of glass to be cut is placed. At the center of the arch is an enlargement 10 having a threaded vertical aperture, thereby forming a nut which carries a stem 11, said stem being threaded to screw into the nut. To the lower end of the stem is secured a presser foot 12 adapted to engage the top of the sheet 9 and hold the same steady while it is being cut. As the stem is screw threaded, it may be run up or down to accommodate the presser foot to different thickness of glass, and the sheet can be firmly clamped to the surface 8. The bottom of the presser foot is covered with leather or other soft material, as indicated at 13, to prevent the glass from being scratched or cracked. The stem is provided with a handle 14 to facilitate its adjustment. On the stem 11 is rotatably and slidably mounted a sleeve 15 carrying a sweep arm 16, the latter, in turn, carrying a cutter 17 at one end. The sleeve has a side lug or enlargement 18 provided with a slot extending transverse of the axis of the sleeve to receive the sweep-arm, the latter being adjustable lengthwise in the slot and being locked in adjusted position by a set screw 19. The sweep-arm is graduated on one side so that it may be accurately set to locate the cutter a distance from the center corresponding to the diameter of the piece to be cut. The cutter 17 is carried by a vertical stem 20 mounted on one end of the sweep-arm 16 and having a handpiece 21 at its upper end. In the lower end of the stem is a socket in which the cutter is held by a set-screw 22. In operation, the stem 11 is run down until the presser foot 12 firmly engages the sheet 9 and holds the same fast. The sweep-arm 16 is now set according to the diameter of the piece to be cut, and then the hand-piece 21 is grasped and with a downward pressure the cutter 17 is revolved around the stem 11, making a true circular cut.

The device is very simply in construction and rapid and efficient in operation, in view of which it effectually serves the purpose for which it is designed.

I claim:

A cutting device comprising a support having a threaded opening, a stem screwed into the said opening and having a presserfoot at its lower end, a sweep-arm carried by the stem, and a cutter carried by the sweep-arm.

In testimony whereof I affix my signature in presence of two witnesses.

HENRY JOHN WLY.

Witnesses:
 JOHN CARLES KAERCHER,
 CLYDE WILLIAM AN.

Copies of this patent may be obtained for five cents each, by addressing the "Commissioner of Patents, Washington, D. C."